(12) United States Patent
Díaz Garcia et al.

(10) Patent No.: US 10,512,906 B2
(45) Date of Patent: Dec. 24, 2019

(54) IN-SITU WASHING PROCEDURE TO RECOVER THE CATALYTIC ACTIVITY OF A DEACTIVATED HYDRODESULFURIZATION CATALYST

(71) Applicant: INSTITUTO MEXICANO DEL PETRÓLEO, Mexico City (MX)

(72) Inventors: Leonardo Díaz Garcia, México (MX); María del Rosario Socorro Luna Ramírez, México (MX); Gonzalo Hernández Tapia, México (MX); Blanca Lucía Medellín Rivera, México (MX); Maria Teresa Gómez Pérez, México (MX); Maria Teresa Cortez De La Paz, México (MX); Alicia del Rayo Jaramillo Jacob, México (MX)

(73) Assignee: INSTITUTO MEXICANO DEL PETRÓLEO, Mexico City (MX)

( * ) Notice: Subject to any disclaimer, the term of this patent is extended or adjusted under 35 U.S.C. 154(b) by 0 days.

(21) Appl. No.: 14/954,176

(22) Filed: Nov. 30, 2015

(65) Prior Publication Data
US 2016/0167039 A1    Jun. 16, 2016

(30) Foreign Application Priority Data
Dec. 11, 2014   (MX) .................... MX/a/2014/015227

(51) Int. Cl.
*B01J 38/56*    (2006.01)

(52) U.S. Cl.
CPC ...................... *B01J 38/56* (2013.01)

(58) Field of Classification Search
CPC . B01J 38/56; B01J 23/883; B01J 23/94; B01J 38/58; B01J 38/02; B01J 35/1061;
(Continued)

(56) References Cited

U.S. PATENT DOCUMENTS 4,062,801 A * 12/1977 Burton .................. B01J 27/285
                                              502/31
4,863,884 A    9/1989 Tasker et al.
(Continued)

FOREIGN PATENT DOCUMENTS

JP         62000747 B  *  1/1987
JP         S62-747        1/1987

OTHER PUBLICATIONS

Mohamadbeigy, K. H. et al., "Study of the effective parameters of hydrotreating catalysts regeneration", Petroleum and Coke (2005), 47(3), 21-25.
(Continued)

*Primary Examiner* — Jennifer A Smith
(74) *Attorney, Agent, or Firm* — Casimir Jones, S.C.; Anne M. Reynolds (57) ABSTRACT

The present invention is an in-situ cleaning procedure for the recovery of catalytic activity of a based alumina HDS catalyst, molybdenum, nickel coated coke and contaminants and it has an HDS activity seriously diminished. The catalyst under study had between 13 and 18 wt % total carbon. Reformate, half the total volume, industrial toluene=35 volume % and Iso-propylic alcohol, 15 volume %, in order to reactivate a deactivated catalyst, a solvent mixture with the following volumetric ratio is prepared. Or it can also be used only reformate (100% volume). The solvent mixture is passed using a LHSV of 2 hr−1 for 72 hours at 50° C. or also using a recirculating three 24-hour cycles at 50° C. Option lasts 24 hours pure reformate LHSV=2h−1 to 50° C. The washed catalyst is fed back to the load reaction conditions maintained for 36 hours at 340° C., to initiate HDS activity balances. During this treatment oxides of molybdenum and nickel in the active phase are re-sulfided by increasing the HDS activity. The In-Situ Cleaning procedure to reactivate deactivated hydrotreating catalysts used to partially remove
(Continued)

the carbon and increase the active phase of molybdenum di-sulphide, and also retrieve specific area, and hydrogenation sites that promote higher hydrodesulfurization activity of gasoil after this treatment.

14 Claims, 1 Drawing Sheet

(58) Field of Classification Search
CPC ... B01J 35/1038; B01J 35/1019; C10G 45/02; C10G 2300/70
See application file for complete search history.

(56) References Cited

U.S. PATENT DOCUMENTS

| | | | |
|---|---|---|---|
| 5,223,464 A * | 6/1993 | Michaelson | B01J 21/20 502/29 |
| 5,230,791 A | 7/1993 | Sherwood, Jr. | |
| 5,254,513 A | 10/1993 | Sherwood, Jr. et al. | |
| 5,445,728 A | 8/1995 | Sherwood, Jr. et al. | |
| 5,906,953 A | 5/1999 | Duddy et al. | |
| 5,916,835 A * | 6/1999 | Carroll | B01J 21/20 502/29 |
| 6,843,813 B1 | 1/2005 | Collins | |
| 2003/0130118 A1 * | 7/2003 | Koyama | B01J 23/85 502/337 |
| 2009/0261019 A1 | 10/2009 | McCarthy et al. | |

OTHER PUBLICATIONS

Abdullah, H. A. et al., "Optimal conditions for coke extraction of spent catalyst by accelerated solvent extraction compared to Soxhlet", Energy & Fuels (2006), 20, 320-323.

Menoufy, M. F. et al., ""Treatment and reuse of spent hydrotreatingcatalyst; Energy Sources, Part A: Recovery, Utilization, and Environmental Effects"", Energy Sources (2008), Part A, 30:1213-1222.

Zhao, Y. et al., "Rejuvenation of residue hydroconversion catalyst by H-donor solvents", Catal. Lett. (2008), 125, 69-75.

Dehgani, A. et al., "Experimental study on recovery of spent hydrocracking catalyst", Petroleum and Coal, Research Institute of Petroleum Industry, Tehran, Iran; (2009), 51(3), 176-180.

Luiz De Souza Pereira, A. et al., "The Importance of Pre-Treatment of Spent Hydrotreating Catalysts on Metal Recovery", Quim. Nova (2011), vol. 34, No. 1, 145-150.

Radwan et al., "Liquid-Liquid Equilibria for the Extraction of Aromatics from Petroleum Naphtha Reformate by 1-Cyclohexyl-2-pyrrolidone/Triethylene Glycol Mixed Solvent."

* cited by examiner

IN-SITU WASHING PROCEDURE TO RECOVER THE CATALYTIC ACTIVITY OF A DEACTIVATED HYDRODESULFURIZATION CATALYST

CROSS-REFERENCE TO RELATED APPLICATION(S)

This claims priority to Mexican Patent Application No. MX/a/2014/015227, filed on Dec. 11, 2014, the entire contents of which are fully incorporated herein by reference.

FIELD OF THE INVENTION

The main objective of the present invention is the partial removal of a contaminant, coke, that it has been adsorbed in a spent industrial hydrodesulfurization catalyst in the diesel hydrotreating process. To achieve this is required to use a hydrocarbon of the following composition: methyl mono aromatic, one aliphatic alcohol and a reformate product obtained of the naphtha reforming unit from a refinery, or well, to use only reformate product, which at contacting with the deactivated catalyst solve the contaminants adsorbed on its surface.

Therefore, this procedure is viable to apply to any deactivated catalyst discharged of gasoil hydrotreating units, but the activity recovery will be less when the coke content in the deactivated catalyst is increased, or to the deactivation degree of the employed catalyst.

Among the alternatives to increase the life cycle of deactivated catalysts in the diesel hydrotreating process, there are oxidative treatments of regeneration, where the adsorbed coke is quasi completely eliminated, and then the HDS activity is recovered at minimum 95% in correlation to a fresh catalyst.

It can be carried out in-situ or ex-situ of hydrotreating reactor, in another words, inside of the reactor or outside of the Reactor. The In-Situ process has as a major disadvantage that in contact with air or oxygen, the catalyst, that it is pyrophoric, could ignite, the catalyst bed during regeneration of the carbon can generate excessive temperature caused by the combustion of coke which is exothermic, the catalyst bed packing would change by coke removing, which produce strong diffusional effects and because the fine powders of the catalyst would remain in the bed would increase clogging, increasing pressure drop in the reactor. Besides coke combustion generate steam which in turn allow steam deactivation of catalytic support and the active sites.

Ex-Situ process is also complex because it involves discharging the deactivated catalyst in an inert atmosphere, transporting it in an inert atmosphere, remove fines and select feasible catalyst regenerated in facilities reactivating company. For eliminate adsorbed diesel and regenerate it in special compartments with mixtures with oxygen/nitrogen or air/nitrogen slowly to avoid sintering of the metals present. In some cases requires re-impregnation of active phase to complete the amount of active metals, this involves more operations and thus has a significant cost for refineries worldwide. So, many times, the best choice is to buy a fresh new catalyst that offers improvements over the previously used catalyst.

A new alternative for a longer life of the deactivated catalysts in Industrial Primary Light Oil Hydrotreating Units is the In-Situ Process Non-oxidative Recovery of the present invention

BACKGROUND OF THE INVENTION

The following patents and articles showing treatments for deactivated catalyst to recover their hydrodesulfurization activity properties, were taken as basis of non-oxidative alternatives to retrieve HDS activity of deactivated catalysts:

U.S. Pat. No. 4,863,884 protects a method to rejuvenate (1) deactivated catalysts used, in this case, a spent hydroprocessing catalyst of heavy hydrocarbons oil which contains 10-40% weight of adsorbed hydrocarbon and 4-10% weight of contaminating metals (Ni+V). The first washing step was carried out with toluene at a superficial velocity of 0.4 feet/second in upward flow, for 4 hours to dissolve all the heavy hydrocarbon adsorbed on the catalyst used, the end system is purged at a pressure of 1-5 psi to evaporate all the solvent and obtain a catalyst free oil which has the following characteristics: Carbon 16.3 wt %, 13.6 wt % sulfur, 1.3 wt % nickel, 6.0% vanadium weight. This catalyst was subjected to a second washing treatment using a 15 weight-% solution of $H_2SO_4$ up flow at a rate of 0.4 ft/sec for one hour. The third step was a water washing at a space velocity of 4 h−1 after which the catalyst is dried at 121° C. And after drying, the reactivated catalyst can be used again as a catalyst in the hydrotreating process of heavy oil fractions.

U.S. Pat. No. 5,230,791 discloses a process for reactivating deactivated hydrotreating catalysts (2) alumina supported. The treatments protected by this invention comprise three stages, the first is treatment with solvent, toluene at a temperature of 93° C. for 4-12 hours followed by air drying at 110° C., then the catalyst is dried at room temperature under vacuum. The following treatment involves the washing with organic solvents from the following group: 1methyl 2-pyrrolidinone, quinolone, n-methyl pyrrolidone, phenol, furfural and their mixtures, heated since 93° C. to 260° C. with treatment periods: 1-12 hours. A slight degree of recovery is observed after 4 washing cycles with these solvents. Regenerating the catalyst after washing is also performed using a mixture containing 1-6% volume oxygen in an inert gas at temperatures from 371 to 482° C.

U.S. Pat. No. 5,254,513A presents a method for the reactivation of deactivated H-Oil catalysts (3) alumina supported, the deactivated catalysts in this process have carbonaceous and metallic deposits and they can be reactivated. A solvent washing is performed to remove process oil, followed by treatment with steam at temperatures of 1000-1250° F. (538-677° C.), the resulting catalyst can be reused in a process of catalytic hydrotreating. Optionally the treated catalyst can be regenerated in the presence of oxygen at 700° F. (371° C.). There are three steps of reactivation: a) removal process oil by washing with hydrocarbon solvents such as toluene, naphtha at 120° C. and dried to obtain an oil-free catalyst; b) contacting the washed catalyst at the previous step with water vapor and c) recovering a reactivated catalyst supported on alumina steam treatment zone for 3-5 hours. Also it included in the patent cases oxidative regeneration at 371° C. in the presence of an oxygen mixture (1.6 wt %) in nitrogen to transform carbonaceous deposits in $CO_2$. The recovery of HDS activity was measured using a model reaction, benzothiophene hydrodesulfurization and recovery obtained by the steam treatment was measured by the HDS conversion was 11.4 wt-% when the catalyst is steamed at 1200° F. for three hours, obtaining an atomic ratio H/C of 0.44.

U.S. Pat. No. 5,445,728 presents the reactivation of a deactivated catalyst HDS-1443B (4) from H-Oil Unit of Criterion Co., which consists of three steps of catalyst treatment:

First, remove the adsorbed hydrocarbon to obtain clean catalyst particles, treatment with steam at temperatures of 537-677° C. and catalytic regeneration @482° C. in a stream of 1.6 volume-% of oxygen diluted in nitrogen. The first step removes adsorbed hydrocarbons in the boiling bed reactor, these can be cleaned intermittently or continuously with liquid hydrocarbon solvent to remove the oil from the process. It can be performed in two ways, the deactivated catalyst can be added to a tank of liquid solvent with stirring, or in a vertical column of liquid solvent may be fed in ascending order, with uniform flow. In both forms washing liquid solvent may be naphtha, toluene and mixtures thereof, the system can be heated to 200-300° F. (93-148° C.), then dried at 250° F. (120° C.) air under vacuum. An alternative approach may be to introduce a flow of nitrogen at high temperature, greater than 500° F. (over 260° C.) until the oil is removed from the process.

U.S. Pat. No. 5,906,953 protects rejuvenation treatment (5) of a deactivated catalyst from CRITERION Company (HDS-2443B) using a vacuum residue from Mexican crude Isthmus/Maya containing 27.8 wt % Carbon Conrradson with an API gravity 4.5, containing 4.2 wt % sulfur and 0.7 wt % nitrogen, with a ratio [C/H] of 8.42, 475 wt-ppm of vanadium and 91 wt-ppm of nickel and 25.3 wt % of insoluble compounds in pentane. This catalyst was reactivated using three steps comprising: first deactivated catalyst is washed with an organic polar solvent which is soluble in both oil and water, acetone is preferred because of its low cost, availability and easy recovery after washing. The space velocity used in this step were 1.5 to 3.0 $h^{-1}$ at atmospheric pressure and a temperature between 32 and 65° C. for 2 hours, it was required a second washing with solvent and then two more water washing. The second washing step corresponds to the removal of metal contaminants using a solution of 10-20 weight-% concentration $H_2SO_4$ effectively removes 30 to 40% by weight of nickel and vanadium deposited on the catalyst, and it is performed twice. Involvement of the active metal phases [Nickel-Molybdenum] is 4% maximum and aluminum in the support 6% maximum. After this treatment two washes with fresh water are required to complete the removal of the acid solution. Subsequently the third treatment is burning coke at 399-454° C. in atmosphere containing oxygen 1-20%, after this final treatment the reactivated catalyst is obtained. The recovery of activity was 90% after the first washing solvent and with sulfuric acid, and after the second wash was achieved 100% activity, based on the data of the fresh catalyst (100%) and considering that deactivated catalyst (0%).

U.S. Pat. No. 6,843,813 B1 protects a cleaning treatment of catalytic mufflers (6) using the following solvent mixture: fifty percent by volume of xylene, twenty percent by volume of acetone and twenty percent by volume of 2-propanol and ten percent by volume of a paraffinic hydrocarbon. This mixture is considered a cleaning composition or rejuvenation of a catalytic converter for treatment with gas and light hydrocarbons, or by the use of vaporizable liquids on deactivated catalysts in removing combustion emissions in automotive vehicles. Treatment does not require disconnecting the catalyst of the engine, fuel can be replaced by the mixture mentioned above, operating at 60-90° C. temperature is achieved rejuvenate the catalyst, improving performance of reducing toxic emissions. Emissions of greenhouse gases are modified muffler off to the muffler reactivated as follows: CO of 2.9 to 0.03 wt %, hydrocarbon from 226 to 24 weight-ppm, $CO_2$ rises from 12.9 to 15.1 weight-% to 2500 RPM, so this treatment is considered effective for this type of deactivated catalysts.

US patent application (6) number 20090261019 considered removing contaminants by washing with solvents followed by treatment of mild regeneration. During regeneration, the washed catalyst is contacted with a gas containing oxygen at an elevated temperature. In various treatments, the temperature during regeneration is at least 300° C., 350° C. and less than 500° C.

Some efforts have been reported to eliminate contaminants of deactivated catalysts, as an alternative enhancement of catalytic activity by catalyst pore unlocking and removing surface contaminants from the active sites. In this patent indicate the initial treatments to these deactivated catalysts consist remove adsorbed hydrocarbons and carbon on the catalyst. The first part of this treatment uses a xylene aromatic compound, for example, followed by a non-polar solvent, cyclohexane and finally another polar solvent such as acetone. Pollutant removal solvent can combine the action of various solvents of different nature, to remove various types of hydrocarbons more effectively. In addition to these solvents stream on the deactivated catalyst, a flow of stream gas is fed simultaneously. This gas must be inert in contact with the deposited carbon and the catalyst, it is generally used nitrogen, which also drag the solvent, coke, water, noble gases and carbon dioxide.

Mohamadbeigy et al (7) reported a method of rejuvenating deactivated catalyst hydrodesulfurization (HDS). The discussion focuses on regeneration of porous catalysts containing alumina as a substrate or base, which it was deactivated during hydrodesulfurization process, the metal contamination is removed by acid treatment. Initially the deactivated catalyst is rinsed with naphtha to remove hydrocarbons and placed in an oven at 120° C. for 24 hours to dry. After this step, the acid washing is performed to remove metal contaminants. Acetic acid is used with different molarities (0.05, 0.10, 0.2 and 0.3M) for this purpose. Acetic acid is placed in a Soxhlet extraction equipment and heated to boiling, the vapors rise through an outer chamber and condense and fall to the bottom of the Soxhlet chamber.

The results of the experiments rejuvenation HDS catalysts show that the deactivated catalyst can be reused in hydrotreating processes. Research aimed at the removal of nickel and vanadium compounds from the surface and pores of HDS deactivated catalyst and in turn improve the BET area without significant removal of the base alumina, through the selection and control of process steps.

Abdullah et al (8) studied optimum conditions for extraction of deactivated catalysts by accelerated extraction techniques and equipment using Soxhlet extraction. The research was carried out to evaluate two methods of extraction: the conventional type Soxhlet extraction and accelerated solvent extraction (ASE). Extracting deactivated catalysts with a number of solvents with gradually increasing polarity is a function of extraction time and the properties of the extraction solvent. In both methods, the deactivated catalyst was successively extracted with n-heptane, toluene, tetra hydrofuran and dichloromethane. Nuclear magnetic resonance (NMR)$^{13}$C were used to study both the coke solubility and insolubility of carbon on the catalyst surface. The study was found that ASE extraction method was superior since it reached less than 5 minutes after solvent extraction the same extraction efficiency than conventional Soxhlet extraction, which requires 6 to 12 hours of extraction.

The article Menoufy et al (9) refers to studies for rejuvenation, metal recovery and re-use of NiMo—Al2O3 catalysts used in the refining of waste lubricating oil. The study included washing the deactivated catalyst extrudate NiMo- $Al_2O_3$ type (containing 8.5 wt % carbon, 4.05 wt % S and 11.55% weight Si) using a soxhlet equipment to remove residual lubricating oil, and then first naphtha with toluene. So far, the researchers reported that the catalyst is considered clean of hydrocarbons containing only C, S and metals; It was dried at 120° C. for 24 hours. Then this dry spent catalyst to a sealed flask and dipped in carbon disulfide (100 ml/10 g) at room temperature, stirred for 12 hours, filtered and dried in air at room temperature. The catalyst was calcined using an electric furnace at 450° C. (25° C./min) for 20 hours at constant temperature to eliminate residual carbon and sulfur.

Subsequently, the procedure was performed to rejuvenate the catalyst by leaching. The experiment was performed in a conical flask fitted with reflux condenser at high temperature (100° C.) immersed in a water bath. 10 g of catalyst were placed (extruded, comminuted, with and without charcoal) in a mixture of 4% oxalic acid previously oxidized with 5% $H_2O_2$. Of the crushed samples were recovered higher metal quantities than in extrudate samples. This is because in crushing, the blocked pores of the catalyst are open and the metals found in these pores are more exposed to the solution by the leaching agents.

Metal recovery carbonless catalysts was greater as the concentration of bleaching agent compared to catalysts with coke increased. This difference was attributed to the oxidation states of the metallic species. The metal catalysts carbonless were at their highest oxidation state, which favored the formation of soluble complexes M oxalate $(C_2O_4)$ X which impacted the leaching rate, whereas catalysts with carbon, the metals were as sulfides, lower oxidation state. It is likely that in the presence of $_{H2O2}$, lower valence metals in the catalysts with carbon, they were oxidized and the total of metals were complexes, so leaching rate was based on the amount of metal ions formed.

Because the grinding process increase the cost involved in the recovery of metals, only extrudates were considered for this purpose. Mo and Ni mainly recovered in addition to P, Zn, Fe, Mg, Ca, Na, K and Si after leaching in different concentrations. Only silicon ($SiO_2$ by XRD and XRF) presented recovery difficulty, increase the difficulty as your concentration is increased in the deactivated catalyst. The catalyst remained with 12.71% of Si after leaching with 4% oxalic acid. Analysis of selective recovery of metals observed that recovers more Mo than Ni. Furthermore, the nickel atoms located in the tetrahedral sites of alumina could be removed by leaching and redistributed on the remaining layer of molybdenum, enhancing their interaction even in presence of silica which is bound to Alumina and it was favored the formation of precursors for Mo—Ni—S, when was carried out with 4% of oxalic acid.

The effect of leaching with 4% of reagent on the textural and mechanical properties was: 87% recovery of surface area and 63% of average pore diameter when the fresh catalyst and improved 203% in the fracture resistance was achieved. These data indicated that the optimum concentration opened and increased catalyst pore diameter, surface area and mechanical strength. By increasing the acid concentration, the reactivated catalyst properties were much lower than those of the fresh catalyst, indicating that the characteristics are dependent on the contents of metals Mo, Ni and Al removed. The results on HDS activity suggest that the contaminating metals and coke are the factors causing the deactivation. The amount of active metals Mo and Ni remaining in the pellets were distributed when leaching was verified to an optimum value in the Mo/Ni ratio of 1.5. The hydrogenation activity was better in the reactivated catalyst than in fresh and deactivated catalysts.

Zhao et al (10) reported an alternative method (reactive solvent extraction) for rejuvenating deactivated hydroprocessing catalysts using hydrogen donor solvents. This alternative treatment may be in situ or ex-situ reactor according to the author, and its application is recommended primarily in cases where conventional regeneration is not a viable alternative to apply.

This study considers previous work with solvents, where hetero atomic solvents such as pyridine and quinoline were not suitable for the removal of carbon due to its adsorption on the catalyst surface. The use of gas oil as a solvent has an adequate performance only in the removal of carbon deposited in the early stages of catalyst operation, but this does not occur during removal of carbon deposited on catalysts with long operation. The use of solvents with the ability to donate hydrogen to promote the conversion of coke, has proven to be a good alternative for the recovery of catalytic activity.

Extraction studies on deactivated hydroprocessing catalysts were carried out with the following solvents: hydrotreated gas oil, 1234 tetrahydro naphthalene (THN) and a mixture of THN/pyrene at 400° C. and a hydrogen pressure of 10 MPa, in order to remove carbon on the catalyst surface and rejuvenating catalyst activity. The reactive extraction with solvents removes partially carbon deposited on the catalyst surface, presenting the following order of effectiveness for extraction: gas oi\ THN\ THN-pyrene. THN shows a much higher capacity than gas oil for the removal of carbon by donating hydrogen in situ for hydrogenating coke.

1234 tetrahydro naphthalene, dihydropyrene, and hexahydropyrene exhibit high ability to donate hydrogen, so mixed solvent systems donors and acceptors of hydrogen as THN-pyrene show some synergism in the conversion of carbon that is deposited in the deactivated catalysts; and pyrene has the capacity to exchange hydrogen and form hydropyrenes. The results showed 35% removal of carbon deposited on the catalyst when dealing with mixed solvent (THN/pyrene) resulting in the recovery of activity of up to 92% over the fresh catalyst.

Concluding that during gasoil hydroprocessing, loss of activity is proportional to the concentration of carbon in the catalyst, it is dominant in activity loss and severely reduces the half-life of the catalyst. The regeneration of these catalysts by methods comprising the deposited coke burning may damage, among other properties, the mechanical strength of the catalyst pellets.

Dehgani and colleagues (11) reported a method to solve the environmental problem that refineries have due to deactivated catalysts. They proposed returning these catalysts to the process by regeneration and rejuvenation. In the article, they presented an experimental study to recover the activity of a deactivated catalyst, in a hydrocracking unit, contaminated with metals and considered as non-regenerable, in order to reuse it in a process unit of HDT of kerosene.

During the experiment, they used two types of deactivated catalysts that contained residual oil of the process, taking as a base catalyst a $NiW/SiO_2-Al_2O_3$ extruded for hydrocracking service. The method started by washing with naphtha the hydrocarbon that has the deactivated catalyst and then subjected to drying. Among the physicochemical properties analyzed of the fresh and deactivated washed with naphtha catalysts, it was reported that: The mechanical strength of the extrudate did not present significant changes while the metals that were deposited on the surface of the deactivated catalyst caused an increase in density and a decrease in surface area. The pore volume decreased by more than 20%. These data indicated that the catalyst was deactivated by pore blockage and contamination of the active sites with coke and metal contaminants. Although coke was removed by calcination in air, the metal remained in the pores.

Rejuvenation consisted on removing the metals deposited in the catalyst washed with naphtha using acetic acid and oxalic acid in Soxhlet apparatus. Subsequently, the treated catalyst is subjected to a process of removing carbon in a rotary horizontal furnace using air and controlling the temperature in the range of 400-700° C. They noted that 500° C. for 5 hours are the best conditions, based on the carbon content and surface area.

The deactivated catalyst had low levels of Fe and Na and minimum V. During leaching, different concentrations of acetic acid (0.1, 0.05 and 0.01 normal) and oxalic acid (0.1, 0.01 and 0.001 normal) were used. With leaching, there was an improvement in the surface area and pore volume because with such a process, pollutants are removed and the pores are opened. From the test HDT of kerosene, it was concluded that, except for the flash point (which is modifiable), the other properties of the product are in accordance with the specifications of kerosene. The most favorable value of HDS was achieved at temperature=300° C.; pressure=35 bar and $H_2/HC=100$.

Souza et al (12) published an article about the importance of pre-treating deactivated hydrotreating catalysts for metal recovery. The paper applies three-step pretreatment for commercial deactivated catalysts NiMo/gamma-alumina type. Soluble coke extraction is made with n-hexane, and the attack of contaminants is done with oxalic acid. When deactivation is reversible, it is possible to restore much of the original activity of the catalyst by removing the deactivating agent or eliminating its effects in the active phase. There are few studies on treatment of coke soluble with solvents and treatment of attack known as "leaching" of pollutants' cover.

For this work two samples of deactivated diesel hydrodesulfurization catalysts, operated for 4 years in two units of hydrotreating heavy gas oil/diesel at a refinery in Brazil were used. Among the metals detected by X-ray fluorescence in these catalysts are iron, calcium and arsenic (Fe, Ca and As), which are not found in the fresh catalysts.

In order to remove the soluble carbon, this author recommends making a Soxleth extraction using 50 grams of the deactivated catalyst in contact with n-hexane for 6 hours. After this treatment, the recovered solvent is evaporated in a rotary evaporator and the organic phase removed from the catalyst is recovered. As a second step, the catalyst sample extracted (5 grams) is washed with 50 ml of aqueous oxalic acid solution, under stirring at 200 RPM at temperatures of 25, 50 and 75° C., times of 30, 60 and 90 minutes, to a variable concentration of oxalic acid (0.04, 0.08 and 0.12 moles per liter). According to the results obtained at 25° C. there are not many differences in the concentration of oxalic acid used, but the intermediate value of 0.08 mol/L is taken as the optimum.

Differences Between Patenting Procedure and Reports

Unlike the procedures used to rejuvenate hydroprocessing catalyst (1,2) of heavy hydrocarbon oil, that use solutions of inorganic acid $H_2SO_4$ type diluted to 15%, this invention does not apply it due to the environmental risks and corrosion that can result in the industrial unit. These treatments that are necessary to remove metal contaminants such as [Ni+V] in hydrotreating catalysts waste are not required in this new invention.

Unlike the cleaning treatment recommended for deactivated catalysts of emissions reduction (5) in automobiles, the mixture of the present invention contains various solvents, in different volumetric ratios. The only similarity is the iso-propanol component, which is used 20 volume % in this treatment, while in our invention is used only 15 volume %. The application reported for the cleaning reduction catalyst of reduction deactivated emissions is used for fuel switching with this solvent mixture in the engine of the vehicle at high temperature combustion and in the case of our invention is carried out at 50° C. in liquid phase.

Compared with application patent (6), which presents the catalyst cleaning using different solvents, this action is sequentially, meaning using a pure solvent each time. The solvents used do not correspond to those employed in this patent employs, and as part distinctive to the procedure are protecting, it is that in our case: we do not regenerate the catalyst with oxygen at temperatures of 350-500° C. When coke burning is carried out in-situ in the reactor leads to corrosion and contamination of the catalytic bed and the total elimination of metal sulfides, active HDS sites.

BRIEF DESCRIPTION OF THE FIGURES OF THE INVENTION

DETAILED DESCRIPTION OF THE INVENTION

Figure 1:
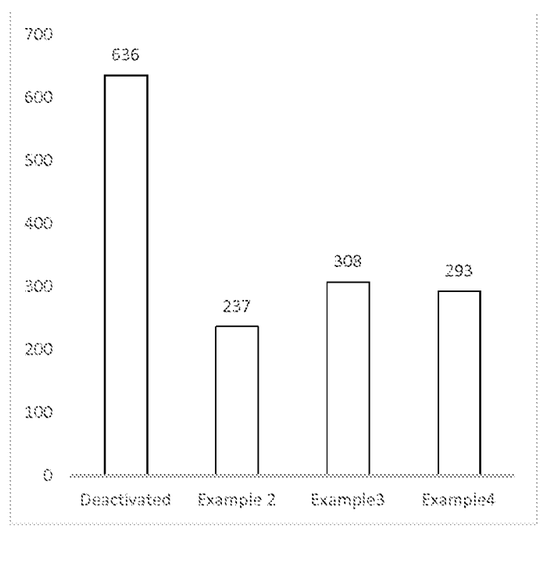
FIG. 1. Shows the decrease in the content of ppm sulfur in diesel hydrotreating process @360° C. of a deactivated catalyst compared with the values obtained by the same catalyst under In-Situ procedures to recover its activity (Example 2, Example 3 and Example 4) of this invention.

The present invention relates to a procedure for washing of contaminants poisons of a deactivated catalyst during hydrotreating of primary light gas oil in a refinery. The washing additive consists of hydrocarbons 3-12 carbon atoms of different chemical families, particularly in smaller proportion of the group of alcohols, a higher proportion of mono-aromatic group and a significant proportion of the hydrocarbons group C5+ called specifically naphtha reformate which it is the product of catalytic reforming of naphthas at the refinery. It is therefore an object of the present invention, to provide a method for washing the contaminants of an industrially deactivated catalyst from primary light gas oil hydrotreating, which through the runtime accumulate on the outer surface of the catalyst.

According to the above, by the procedure of this invention the catalytically active sites contaminated with coke are unblocking active sites, in order to increase the hydrodesulfurization (HDS) catalytic activity without damaging the metal sulphides phases of molybdenum and nickel present.

It is also an objective of the present invention the partial recovery of the HDS activity of a diesel hydrotreating catalyst deactivated by coke with a carbon content of 12-14 weight-%.

The procedure used in this invention includes preparation of a mixture of hydrocarbons of different chemical families, 40-60% of a mono-methylated aromatic hydrocarbon, in 12-17% of an oxygenated hydrocarbon of R—OH formula where R may be a saturated alkylic containing the hydroxyl radical in the internal carbon; and contains 20-30% volume of linear and branched aliphatic hydrocarbons of 5 to 12 carbon atoms, including any fraction of cyclic paraffin.

The procedure for preparation of the solvent mixture used in this invention consists of the following steps, measuring the volume used in the evaluation unit according to the volume of catalyst bed. This is important because the process of this invention recommends a liquid hour space velocity (LHSV) from 5 to 1 hour-1, more preferably between 2.5 and 2.0 hours-1 which means a waste of solvent per hour minimum, double of volume of the catalyst bed.

Taking into account a calculation basis of 1 cubic meter ($m^3$) of deactivated for the recovery process of the deactivated catalyst HDS activity catalyst industrially. Based on the above it is determined in the solvent mixture should control a constant flow of 2 cubic meters ($m^3$) per hour.

In order to obtain a mixture suitable for the recovery procedure of the HDS activity of the deactivated catalyst industrially required that the hydrocarbon mixture is vigorously stirred to be homogeneous during the washing procedure.

The specific mixture of solvents for contaminants washing type: aliphatic carbon, aromatic carbon, sulfur, iron showing to be active to remove less of aliphatic carbon present in the catalyst, a smaller amount of aromatic carbon, fewer sulfur of sulfides present and a slight amount of iron among other contaminants. Specifically, when the deactivated catalyst, study matter of this invention which had been operating for five years in a primary light gas oil hydrodesulfurization unit at industrial level.

With this washing additive is possible to solve aliphatic carbon compounds present in the deactivated catalyst, which are also responsible for HDS catalyst activity decreased for blocking the active sites hydrotreating inhibiting the efficient entry reactants through the catalyst. Achieved after this treatment increase activity hydrodesulfurization primary light gas oil in more than 30% allowing in principle increase the catalyst life cycle measured as the amount of processed hydrotreating barrels per kilogram of catalyst.

Hydrocarbons Additive Preparation for Washing

Formulate a liquid mixture to wash contaminants for use in reactivation treating of a deactivated catalyst industrially. A stream of naphtha reformate from refinery, industrial grade solvents toluene and iso-propyl alcohol are acquired. The total volume of treatment to be performed based on the volume of the catalyst bed to be treated and duration of the wash cycle, the following equation is calculated:

Minimum Required Volume ($L$,Volume Unit)
=LHSV*$H$*VLC

Where:
Space velocity LHSV=used=$2H^{-1}$
VLC=Volume of catalyst in bed, volume (L, volume unit)
H=hours of treatment required=24 or 72

Preparation of the additive mixture of solvents used in the process of the present invention requires its measurement with an instrument, the solvents used are liquid at room temperature and perfectly miscible between them, so that the mixtures employed in this invention are homogeneous and feasible to use in contaminants washing mainly carbon of the deactivated catalysts industrially.

The procedure of this invention can use hydrocarbon solvents of different types: paraffinics, aromatics, naphthenes and oxygenated, although the use of nitrogen compounds is preferably avoided, to no affect the quality of diesel with nitrogenates residues in the catalyst bed, additionally it can be a strong poison for active sites of hydrotreating primary light gas oil catalysts.

Example 1

As a diagnosis of the degree of aging of an industrially deactivated catalyst in hydrotreating unit Mexican primary light gas oil for five years, this sample was analyzed thoroughly, defining as a major pollutant: carbon deposited on the catalyst pores.

The deactivated catalyst industrially during primary light gas oil hydrotreating was discharged and dried in an inert atmosphere in the same industrial unit, this material no longer containing adsorbed gas oil. It was characterized in terms of their main contaminants as shown in the following table.

TABLE 1

Analysis of contaminants and active phase of deactivated catalyst.

| Composition | Value | Unit |
|---|---|---|
| Total Carbon | 14.03 | weight % |
| $^{13}$C NMR: | 0.66 | [Aliphatic/Aromatic] w/w |
| Total Sulfur | 7.92 | weight % |
| Iron content | 0.45 | weight % |
| Molybdenum content | 9.04 | weight % |
| Nickel content | 2.76 | weight % |
| Phosphorus | 1.50 | weight % |

It is considered important to determine the type of carbon deposited on the deactivated hydrotreating catalyst, this finding is done by $^{13}$C Nuclear Magnetic Resonance (NMR) of the solid state where a relationship is obtained [w/w] to [4/6 ratio] of aliphatic carbon against aromatic carbon for this sample.

To evaluate the HDS activity of the hydrotreating catalysts, one deactivated industrially catalyst and the others, washed with solvents to reactivation, in order to measure the degree of recovery of hidrodesulfurization sites at pilot plant level. In all cases were used 60 $cm^3$ of catalyst volume in the form of extrudates tetra lobular ⅟₁₆" diameter and as refinery feedstock, primary light gas oil from Ciudad Madero, Tamaulipas, Mexico.

TABLE 2

Properties of primary light gas oil from Ciudad Madero, Tamaulipas

| Properties | Value | Method |
|---|---|---|
| Density, 20/4° C. | 0.8624 | ASTM-D-1282 |
| Total Sulfur | 19,100 ppm | ASTM-D-4294 |
| Total Nitrogen | 314 ppm | ASTM-D-4629 |
| Aromatics content | 35.5 wt-% | ASTM-D-5186 |
| Mono Aromatics | 20.8 wt % | ASTM-D-5186 |
| Di Aromatics | 11.2 wt-% | ASTM-D-5186 |
| Poly Aromatic | 3.5 wt-% | ASTM-D-5186 |
| Atmospheric Distillation | ° C. | ASTM-D-86 |
| Start Boiling Point | 236 | |
| 30 | 295.5 | |
| 50 | 307.6 | |
| 70 | 319.9 | |
| End Boiling Point | 349.1 | |
| Total volume | 98.3% | |
| Residue | 1.0% | |
| Loss | 0.7% | |

In order to have an initial measurement (baseline) of the HDS activity of the deactivated industrially catalyst, it was carried out the catalytic evaluation using a methodology to determine conversion levels by effect of catalytic bed temperature, in the first part, it was necessary an activation step with the feed of primary light gas oil for 4 hours at 360° C. of temperature in order to sulfurize the partially oxidized sites before starting 6 hours balances at 340, 360 and 380° C. including the reaction parameters shown below:

TABLE 3

Conditions of HDS catalytic evaluation for deactivated industrial catalyst

| Pressure kg/cm$^2$ | Temperature ° C. | LHSV h$^{-1}$ | H$_2$/HC ft$^3$/bbl | Time hours | Feedstock |
|---|---|---|---|---|---|
| 46 | 360 | 1.5 | 2000 | 4 | LGO Madero |
| 63 | 340 | 1.5 | 2000 | 6 | LGO Madero |
| 63 | 360 | 1.5 | 2000 | 6 | LGO Madero |
| 63 | 380 | 1.5 | 2000 | 6 | LGO Madero |

The results obtained of this evaluation are taken as basis for the calculation of Recovery of HDS Activity of the washed catalyst to remove contaminants in the following examples.

Example 2

(A) Mixture Reformate-toluene-2-propanol

The washing mixture is performed at room temperature, first placing the necessary volume of reformate naphtha into a suitable container, calculating for this first solvent comprises 50 volume-%. Immediately, was added the amount of mono-aromatic solvent, i.e. toluene with 35 volume-% ratio. While the iso-propyl alcohol is added in 15 volume-% respectively.

As in Example 1 a volume of 60 mL deactivated catalyst in tetra lobular extruded form 1/16 inch diameter, which is placed in a reactor of the evaluation unit to pilot plant level is used.

In this example conditions used of In-Situ washing of contaminants are shown in table 4.

TABLE 4

Operating conditions for In-Situ Cleaning of pollutants using Reformate-iso-propyl alcohol-Toluene in one step without recirculation

| Pressure kg/cm$^2$ | Temperature ° C. | LHSV h$^{-1}$ | Nitrogen/HC ft$^3$/bl | Time hours |
|---|---|---|---|---|
| 30-80 | 30-70 | 2.0 | 1200 | 72 |

The total volume solvent mixture used was 8.64 liters corresponding to [72 hours×120 ml]=8,640 ml.

Example 3

(B) Mixture of Washing Industrial Nature Stream (Reformate)

The washing mixture in this particular case is exclusively the reformate industrial stream obtained from Ciudad Madero refinery, which consists of a hydrocarbons mixture with high percentage of toluene, naphthenes and fewer quantity of paraffins, all in the range from 5 to 12 carbon atoms. For this procedure it was possible to reduce the washing time based on the response of recovery HDS activity of the deactivated industrial catalyst, since longer times, the effect was not positive.

In this example the following in-situ contaminant washing conditions where the treatment time is reduced for better catalytic response, see Table 5.

TABLE 5

Operating conditions for In-Situ pollutants washing using Reformate without recirculation.

| Pressure, kg/cm$^2$ | Temperature ° C. | LHSV, h$^{-1}$ | Rel. N$_2$/HC, ft$^3$/bl | Time, hours |
|---|---|---|---|---|
| 30-80 | 30-70 | 2.0 | 1200 | 24 |

The total volume of solvent used was 2.88 liters, corresponding to 24×120 ml=2,880 milliliters of Reformate Example 4

(C) Mixture Reformate-toluene-2-propanol (with 3 Cycles of Recirculation)

This procedure is done with the same solvent mixture used in Example 2, but with the difference in methodology that washing solvent includes recirculation in three cycles of 24 hours in order to save solvent and minimizing the hydrocarbons used during contaminants washing. The conditions used are shown in Table 6, where solvent consumption reduction does not affect the treatment time.

TABLE 6

In-Situ Washing Conditions using Reformate-Toluene-2-Propanol with recirculation (3 cycles)

| Pressure, kg/cm$^2$ | Temperature ° C. | LHSV, h$^{-1}$ | Rel. N$_2$/HC, ft$^3$/bl | Time, hours | Solvents |
|---|---|---|---|---|---|
| 10-80 | 30-70 | 2.0 | 1200 | 72 | Reformate-Toluene-2propanol |

The total volume of solvents mixture was only 2.88 liters each 24 hours and the solvents are recycled three times (cycles).

This methodology was effective even though the spent solvent was not cleaned in the reactor outlet, before recirculating back to the catalyst bed.

Example 5

To evaluate the effectiveness of washing treatments of deactivated catalyst using three different procedures: Washing procedures A, B and C (Examples 2, 3, and 4 respectively) compared with the activity of deactivated catalyst (Example 1) using the same evaluation methodology for HDS activity using primary light gas oil shown in Table 3 above.

TABLE 7

Comparison HDS catalytic activity of deactivated catalyst versus In-Situ washed catalysts at pilot plant

| Temperature | Deactivated weight-% | Example 2 Reformate-Toluene-2propanol (72 h) Once through weight-% | Example 3 Only Reformate (24 h) Once through weight-% | Example 4 Reformate-Toluene-2propanol (3 cycles Recirculation) weight-% |
|---|---|---|---|---|
| 340° C. | 91.6 | 94.8 | 93.7 | 95.0 |
| 360° C. | 96.8 | 98.7 | 98.4 | 98.5 |
| 380° C. | 99.1 | 99.7 | 99.7 | 99.7 |

It is noted that even the deactivated catalyst has catalytic activity and that this can be further increased after In-Situ washing, according to the examples 2, 3 and 4.

Additionally, hydrodesulfurization (HDS) activity were higher for Examples 2 and 4 @340 and 360° C. using Reformate-Toluene-2-propanol (one step and with recirculation at medium pressure respectively).

At 380° C. HDS activities were similar for all the washed catalysts by the procedure of this patent around 99.7%, indicating a limit of recovery in the active sites for these catalysts.

TABLE 8

Data obtained in diesel product (ppm sulfur) using the deactivated catalyst versus In-Situ washed catalysts at pilot plant

| Temperature ° C. | Deactivated S ppm | Example 2 S ppm | Example 3 S ppm | Example 4 S ppm |
|---|---|---|---|---|
| 340 | 1652 | 987 | 1197 | 951 |
| 360 | 636 | 237 | 308 | 293 |
| 380 | 177 | 57 | 65 | 66 |

Quality hydrotreated primary light gas oil is measured in parts per million of sulfur, in the case of deactivated catalyst a quality value of 250 ppm was taken like a production base, Example 2 achieves this quality at calculated temperature of 359.65° C. While the other options require 364.77° C. and 363.79° C. respectively.

Therefore, it can be considered that the solvent mixture: Reformate-Toluene-Isopropyl alcohol is better to reactivate the HDS catalytic function as the starting run occurs at temperature of 360° C. to 237 ppm S as can be seen in Table 8. While examples 3 and 4 to the same temperature condition obtained 308 and 293 ppm of sulfur respectively.

TABLE 9

Relative Characterization of Deactivated catalyst versus In-situ washed Catalysts at pilot plant

| | Deactivated | Example 2 | Example 3 | Example 4 |
|---|---|---|---|---|
| Carbon, weight % | 14.07 | 10.2 | 11.4 | 10.9 |
| BET Surface, m²/g | 118 | 139 | 130 | 122 |
| Pore Volume | 0.22 | 0.28 | 0.25 | 0.26 |
| Pore diameter | 92 | 78 | 86 | 87 |
| Aliphatic Carbon % | 40.5 | 37.9 | 31.5 | 31.97 |
| Aromatic Carbon % | 59.5 | 62.1 | 68.5 | 68.03 |
| $^{RMN}$ [Alif/Arom] Ratio | 0.68 | 0.61 | 0.46 | 0.47 |

When comparing the deactivated catalyst versus in-situ solvents washing catalysts, we can mention that the improvement is given by reduction of total carbon in the catalysts, this is about 22-28%. The specific area is increased after solvent washing, as well as the pore volume. The effect is inverse for the average pore diameter decreasing values of 92 to 78-86 Amstrong. About the carbon type, a decrease is observed only in the region of aliphatic carbon, while aromatic carbon was increased. The carbon NMR [Aliphatic/Aromatic] ratio for catalysts washed in-situ with solvents were lower than in the deactivated catalyst.

TABLE 10

Characterization by XPS of the active sites of deactivated catalyst versus in-situ washed catalysts at pilot plant.

| | Deactivated | Example 2 | Example 3 | Example 4 |
|---|---|---|---|---|
| MoS$_2$ (Mo3d) | 57.7 | 70.13 | 70.28 | 69.66 |
| NixSy (S2p) | 39.8 | 41.08 | 26.85 | 40.43 |
| NiMoS (S2p) | 0.0 | 11.29 | 22.22 | 14.89 |

In Table 10 can be confirmed that the active species of the washed catalyst with are higher than deactivated catalyst, this is evidence that the process for reactivating deactivated catalysts was successful regarding the improvement of the active sites present.

Particularly for the species MoS$_2$ increased 57.7% to average values of 70% in all washed cases. While sulfur species attributed to combined phase: Ni—Mo—S increased from 0 (deactivated) to 11.29, 22.22 and 14.89% (Examples 2, 3 and 4) respectively.

Example 6

As a measure of the impact on the solvent used in the coke washing of deactivated catalyst in Example 3, the sulfur content of the contaminated reformate at the output of in-situ recovery treatment was analyzed. To reduce the sulfur content of the reformate obtained after washing, a study adsorption using alumina support of high porosity (AP) in one step at room temperature and as second alternative separation by Soxhlet equipment at 130° C. was performed. The results of the sulfur present in these streams are presented in the following table.

TABLE 11

Cleaning for In-Situ contaminated Reformate used to recover HDS activity of deactivated catalyst

| Stream | Total Sulfur (ppm) | Procedure Stage |
|---|---|---|
| Reformate Input | 0.0-0.5 | Feed |
| Contaminated reformate 24 h | 288 | Discharged |
| Alumina Adsorption AP | 184 | Room temperature |
| Separation by Distillation: | | |
| Light fraction <130° C. | 14 | HDS (95 wt-%) |
| Heavy fraction >130° C. | 274 | |

According to the above table, the recovered solvent is feasible to integrate into the gasoline pool if it is distilled into two fractions at a cutting temperature of 130° C., or integrated as a diluent loading the hydrotreating process of catalytic naphtha and that its sulfur content is very low, 0.0288 wt-% sulfur versus 0.28 wt-% typical value of fluid catalytic cracking (FCC) naphtha. Or otherwise you can send completely the contaminated reformate as a feed for hydrotreating process like primary naphtha, FCC or coker naphthas to recover this valuable stream of high octane number (90-95).

REFERENCES

1) U.S. Pat. No. 4,863,884, Kenneth G. Tasker, John D. Milligan, HRI Inc., Method for Rejuvenating Used Catalysts, Sep. 5, 1989.
2) U.S. Pat. No. 5,230,791, David E. Sherwood, Texaco Development Co., Process for the reactivation of spent alumina-supported hydrotreating catalysts, Jul. 27, 1993.
3) U.S. Pat. No. 5,254,513 David Sherwood Jr, Johnnie R. Hardee, Texaco Inc., Method for the reactivation of spent alumina-supported hydrotreating catalysts, Oct. 9, 1993

3) U.S. Pat. No. 5,445,728, David E. Sherwood Jr., Johnnie R. Hardee Jr., TEXACO INC., Method for the reactivation of spent alumina-supported hydrotreating catalysts, Aug. 29, 1995
4) U.S. Pat. No. 5,906,953, Duddy John E., Abrams Lawrence M. Hildebrandt Steven J., Catalyst Rejuvenation Process, published by May 25, 1999.
5) U.S. Pat. No. 6,843,813 B1, Hugh Frederick Collins, Rejuvenation and/or cleaning of catalysts, published by Jan. 18, 2005.
6) US Patent Application 20090261019, McCarthy, Stephen J.; Bai, Chuansheng; Borghard, William G.; Lewis, William E., ExxonMobil Research and Engineering Company, Hydroprocessing using rejuvenated supported Hydroprocessing catalysts, (2009).
7) Mohamadbeigy K H, Binesh R., Study of the effective parameters of hydrotreating catalysts regeneration. Petroleum and Coke (2005), 47(3), 21-25.
8) Abdullah, H A; Hauser A; Ali A; Al-Adwani A, Optimal conditions for coke extraction of spent catalyst by accelerated solvent extraction compared to Soxhlet. Energy & Fuels (2006), 20, 320-323.
9) M. F. Menoufy and H. S. Ahmed; Treatment and reuse of spent hydrotreating catalyst; Energy Sources, Part A: Recovery, Utilization, and Environmental Effects; Energy Sources (2008), Part A, 30:1213-1222.
10) Zhao, Y; Gray, M. R; Wei, F. Rejuvenation of residue hydroconversion catalyst by H-donor solvents. Catal. Lett. (2008), 125, 69-75.
11) A. Dehgani, Kh. Forsat, Kh. Mohammadbeigy, S. H. Boroojerdi, Research Institute of Petroleum Industry, Tehran, Iran; Experimental study on recovery of spent hydrocracking catalyst; Petroleum and Coke (2009), 51(3), 167-171.
12) Alexandre Luiz de Souza Pereira, Cristiano Nunes da Silva e Julio Carlos Alfonso, The Importance of Pre-Treatment of Spent Hydrotreating Catalysts on Metal Recovery, Quim. Nova (2011), Volume 34, No. 1, 145-150

The invention claimed is:

1. A procedure for removing coke from a deactivated hydrodesulfurization catalyst and recovering online hydrodesulfurization activity of the deactivated hydrodesulfurization catalyst, the procedure comprising the steps of:
a) Introducing a flow of solvent containing industrial naphtha reformate within a bed of the deactivated hydrodesulfurization catalyst;
b) Increasing the temperature to the range of 30 to 70° C.;
c) Introducing a flow of inert gas into the bed of the deactivated hydrodesulfurization catalyst, wherein the inert gas is nitrogen, argon, or helium; and
d) Increasing the pressure of the inert gas to the range of 30 to 80 Kg/cm$^2$, to thereby remove coke from the hydrodesulfurization catalyst, whereby the online hydrodesulfurization activity of the catalyst after the procedure is higher than the online hydrodesulfurization activity of the catalyst before the procedure.

2. The procedure according to claim 1, wherein the naphtha reformate is a refinery stream having an initial boiling temperature of 120° C. and a final boiling temperature of 230° C.

3. The procedure according to claim 1, wherein the naphtha reformate comprises a mixture of hydrocarbons, paraffinic, iso-paraffinic, olefinic, naphthenic and aromatic, from 5 to 12 carbon atoms.

4. The procedure according to claim 1, wherein the industrial naphtha reformate is a single solvent used in step a).

5. The procedure according to claim 1, wherein the industrial naphtha reformate is diluted with toluene in volume ratio of 8 to 4.

6. The procedure according to claim 1, wherein the industrial naphtha reformate is diluted with a paraffinic alcohol which is ethyl alcohol, isopropyl alcohol, n-propyl alcohol, or combinations thereof in a volumetric ratio preferably 5 to 1.5.

7. The procedure according to claim 1, wherein the industrial naphtha reformate is mixed with toluene and iso-propyl alcohol in a volumetric ratio 1:0.7:0.3, further comprising executing a single wash for a continuous period of 72 hours.

8. The procedure according to claim 1, wherein the industrial naphtha reformate is mixed with toluene and iso-propyl alcohol in a volumetric ratio 1:0.7:0.3, further comprising performing a wash in three 24-hour cycles using recirculation of the solvent mixture.

9. The procedure according to claim 1 or 7, further comprising washing the coke of the catalyst for at least 72 hours.

10. The procedure according to claim 1 or 8, further comprising washing the coke of the catalyst for 24 hours, recycling the recovered solvent back to the bed containing the deactivated catalyst for 24 hours, and washing yet again to complete recirculation to 72 hours washed with this solvent mixture.

11. The procedure according to claim 1, further comprising washing with a reformate modified at 50% volume by addition of toluene and iso-propyl alcohol in a ratio of 1:0.7:0.3 volume during 72 hours once through.

12. The procedure according to claim 1, wherein the procedure is applied in-situ of the reactor containing the deactivated catalyst with treatment times ranging from 24 hours to 72 hours.

13. The procedure according to claim 1, wherein the procedure is applied in-situ, causing a decrease in surface carbon between 18.7% and 27.7 weight %, and recovering catalyst active sites as determined by an increase of $MoS_2$ species observed by XPS from about 57.7% in the deactivated catalyst to about 70% in the catalyst after the procedure.

14. The procedure according to claim 1, wherein the hydrodesulfurization catalyst comprises metal sulfides of molybdenum and nickel.

* * * * *